(12) United States Patent
Bayliss

(10) Patent No.: US 8,290,914 B2
(45) Date of Patent: Oct. 16, 2012

(54) SYSTEM OF AND METHOD FOR PROXIMAL RECORD RECAPTURE WITHOUT THE NEED FOR HUMAN INTERACTION

(75) Inventor: David Alan Bayliss, Delray Beach, FL (US)

(73) Assignee: LexisNexis Risk Data Management, Inc., Boca Raton, FL (US)

( * ) Notice: Subject to any disclaimer, the term of this patent is extended or adjusted under 35 U.S.C. 154(b) by 237 days.

(21) Appl. No.: 12/873,449

(22) Filed: Sep. 1, 2010

(65) Prior Publication Data

US 2012/0054199 A1    Mar. 1, 2012

(51) Int. Cl.
*G06F 7/00* (2006.01)
*G06F 17/00* (2006.01)

(52) U.S. Cl. ............... 707/690; 707/688; 707/748

(58) Field of Classification Search ............ 707/690, 707/688, 748
See application file for complete search history.

(56) References Cited

U.S. PATENT DOCUMENTS

| | | | |
|---|---|---|---|
| 6,374,241 B1 * | 4/2002 | Lamburt et al. ............... 1/1 |
| 6,523,019 B1 * | 2/2003 | Borthwick .................. 706/45 |
| 8,166,033 B2 * | 4/2012 | Kazi et al. .................. 707/737 |
| 8,170,998 B2 * | 5/2012 | Churi et al. ................. 707/690 |
| 2002/0073099 A1 * | 6/2002 | Gilbert et al. ............ 707/104.1 |
| 2003/0126156 A1 * | 7/2003 | Stoltenberg et al. ...... 707/104.1 |
| 2006/0184584 A1 * | 8/2006 | Dunn et al. ................ 707/200 |
| 2008/0005106 A1 * | 1/2008 | Schumacher et al. ........... 707/6 |
| 2011/0066629 A1 * | 3/2011 | Escalante et al. ........... 707/765 |

\* cited by examiner

*Primary Examiner* — Giovanna Colan
(74) *Attorney, Agent, or Firm* — Ryan A. Schneider, Esq.; Mark Lehi Jones; Troutman Sanders LLP

(57) ABSTRACT

Disclosed is a system for, and method of, determining whether records and entity representations should be delinked. The system and method need no human interaction in order to calculate internal match scores by considering data associated with an entity representation and external match scores by considering data external to the entity representation. The system and method uses the internal match scores and external match scores to make the delinking decisions.

28 Claims, 2 Drawing Sheets

SYSTEM OF AND METHOD FOR PROXIMAL RECORD RECAPTURE WITHOUT THE NEED FOR HUMAN INTERACTION

CROSS REFERENCE TO RELATED APPLICATIONS

The following patents and patent applications are related to the present disclosure and are hereby incorporated by reference in their entireties:

U.S. Pat. No. 7,293,024 entitled "Method for sorting and distributing data among a plurality of nodes" to Bayliss et al.;

U.S. Pat. No. 7,240,059 entitled "System and method for configuring a parallel-processing database system" to Bayliss et al.;

U.S. Pat. No. 7,185,003 entitled "Query scheduling in a parallel-processing database system" to Bayliss et al.;

U.S. Pat. No. 6,968,335 entitled "Method and system for parallel processing of database queries" to Bayliss et al.;

U.S. patent application Ser. No. 10/357,447 entitled "Method and system for processing data records" to Bayliss et al.;

U.S. patent application Ser. No. 10/357,481 entitled "Method and system for linking and delinking data records" to Bayliss et al.;

U.S. patent application Ser. No. 10/293,482 entitled "Global-results processing matrix for processing queries" to Bayliss et al.;

U.S. patent application Ser. No. 10/293,475 entitled "Failure recovery in a parallel-processing database system" to Bayliss et al.;

U.S. patent application Ser. No. 10/357,418 entitled "Method and system for processing and linking data records" to Bayliss et al.;

U.S. patent application Ser. No. 10/357,405 entitled "Method and system for processing and linking data records" to Bayliss et al.;

U.S. patent application Ser. No. 10/357,489 entitled "Method and system for associating entities and data records" to Bayliss et al.;

U.S. patent application Ser. No. 10/357,484 entitled "Method and system for processing data records" to Bayliss et al.;

U.S. patent application Ser. No. 11/671,090 entitled "Query scheduling in a parallel-processing database system" to Bayliss et al.;

U.S. patent application Ser. No. 11/772,634 entitled "System and method for configuring a parallel-processing database system" to Bayliss et al.; and U.S. patent application Ser. No. 11/812,323 entitled "Multi-entity ontology weighting systems and methods" to Bayliss.

The above applications are referred to herein as the "First Generation patents And applications." This disclosure may refer to various particular features (e.g., figures, tables, terms, etc.) in the First Generation patents And applications. In the case of any ambiguity of what is being referred to, the features as described in U.S. patent application Ser. No. 11/772,634 entitled "System and method for configuring a parallel-processing database system" to Bayliss et al. shall govern.

Also incorporated by reference in their entireties are:

U.S. patent application Ser. No. 12/188,742 entitled "Database systems and methods for linking records and entity representations with sufficiently high confidence" to Bayliss;

U.S. patent application Ser. No. 12/429,337 entitled "Statistical record linkage calibration for multi token fields without the need for human interaction" to Bayliss;

U.S. patent application Ser. No. 12/429,350 entitled "Automated selection of generic blocking criteria" to Bayliss;

U.S. patent application Ser. No. 12/429,361 entitled "Automated detection of null field values and effectively null field values" to Bayliss;

U.S. patent application Ser. No. 12/429,370 entitled "Statistical record linkage calibration for interdependent fields without the need for human interaction" to Bayliss;

U.S. patent application Ser. No. 12/429,377 entitled "Statistical record linkage calibration for reflexive, symmetric and transitive distance measures at the field and field value levels without the need for human interaction" to Bayliss;

U.S. patent application Ser. No. 12/429,382 entitled "Statistical record linkage calibration at the field and field value levels without the need for human interaction" to Bayliss;

U.S. patent application Ser. No. 12/429,394 entitled "Statistical record linkage calibration for reflexive and symmetric distance measures at the field and field value levels without the need for human interaction" to Bayliss;

U.S. patent application Ser. No. 12/429,403 entitled "Adaptive clustering of records and entity representations" to Bayliss;

U.S. patent application Ser. No. 12/429,408 entitled "Automated calibration of negative field weighting without the need for human interaction" to Bayliss;

U.S. patent application Ser. No. 12/496,861 entitled "Statistical measure and calibration of search criteria where one or both of the search criteria and database is incomplete" to Bayliss;

U.S. patent application Ser. No. 12/496,876 entitled "A system and method for identifying entity representations based on a search query using field match templates" to Bayliss;

U.S. patent application Ser. No. 12/496,888 entitled "Batch entity representation identification using field match templates" to Bayliss;

U.S. patent application Ser. No. 12/496,899 entitled "System for and method of partitioning match templates" to Bayliss;

U.S. patent application Ser. No. 12/496,915 entitled "Statistical measure and calibration of internally inconsistent search criteria where one or both of the search criteria and database is incomplete" to Bayliss;

U.S. patent application Ser. No. 12/496,929 entitled "Statistical measure and calibration of reflexive, symmetric and transitive fuzzy search criteria where one or both of the search criteria and database is incomplete" to Bayliss;

U.S. patent application Ser. No. 12/496,948 entitled "Entity representation identification using entity representation level information" to Bayliss; and U.S. patent application Ser. No. 12/496,965 entitled "Technique for recycling match weight calculations" to Bayliss.

These applications are referred to herein as the "Second Generation patents And applications."

Also incorporated by reference in their entireties are U.S. patent application Ser. No. 10/866,456 entitled "System and method for returning results of a query from one or more slave nodes to one or more master nodes of a database system" to Chapman et al., U.S. patent application Ser. No. 10/866,204 entitled "System and method for processing query requests in a database system" to Chapman et al., U.S. patent application Ser. No. 10/866,565 entitled "System and method for processing a request to perform an activity associated with a precompiled query" to Chapman et al., and U.S. patent application Ser. No. 10/866,394 entitled "System and method for managing throughput in the processing of query requests in a database system" to Chapman et al. These applications are referred to herein as the "'866 Applications." This disclosure may refer to various particular features (e.g., figures, tables, terms, etc.) in the '866 Applications. In the case of any ambiguity of what is being referred to, the features as described in U.S. patent application Ser. No. 10/866,204 entitled "System and method for processing query requests in a database system" to Chapman et al. shall govern.

FIELD OF THE INVENTION

The invention relates to database systems and methods. More particularly, the invention relates to techniques for delinking records in a database. Certain embodiments allow for accurate de-linkage of records using an iterative process without the need for human interaction.

SUMMARY OF THE CLAIMED INVENTION

Certain embodiments are disclosed herein. Such exemplary embodiments include a system, and computer implemented process, for delinking a record from an entity representation in a computer implemented electronic database using a matching formula. The database includes a plurality of entity representations, each entity representation includes a plurality of linked electronic records, each electronic record includes a plurality of fields, each field is capable of containing a field value. The exemplary embodiments include selecting a matching formula. The exemplary embodiments also include selecting a record linked to an entity representation. The exemplary embodiments further include calculating a plurality of internal match scores for the selected record using the selected matching formula, wherein each internal match score of the plurality of internal match scores is associated with a record pair comprising the selected record and one other record linked to the entity representation. The exemplary embodiments further include calculating a plurality of external match scores for the selected record using the selected matching formula, wherein each external match score of the plurality of external match scores is associated with a record pair comprising the selected record and one other record in the electronic database that is not linked to the entity representation. The exemplary embodiments further include aggregating the plurality of internal match scores into an aggregated internal match score. The exemplary embodiments further include aggregating the plurality of external match scores into an aggregated external match score. The exemplary embodiments further include comparing a difference between the aggregated internal match score and the aggregated external match score to a threshold. The exemplary embodiments further include delinking, in the electronic database, the selected record from the entity representation as a result of the difference exceeding the threshold.

BRIEF DESCRIPTION OF THE DRAWINGS

The invention, both as to its structure and operation together with the additional objects and advantages thereof are best understood through the following description of exemplary embodiments of the present invention when read in conjunction with the accompanying drawings.

DETAILED DESCRIPTION

Figure 1:
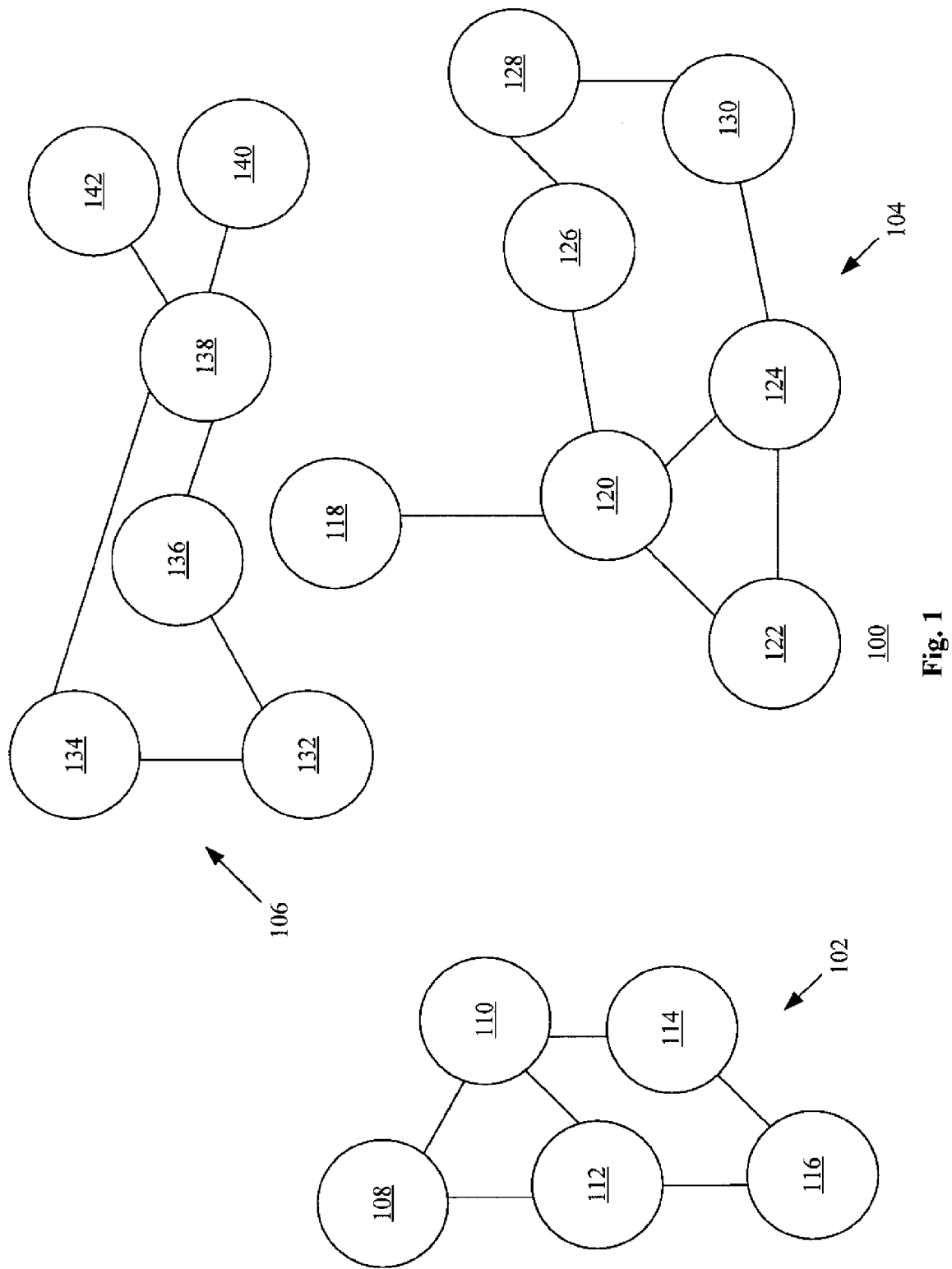
FIG. 1 illustrates an exemplary diagram of an embodiment of an invention.

The following detailed description presents inventive concepts for delinking. Certain terms used herein are discussed presently. The term "entity representation" encompasses at least one record, and, more typically, a collection of linked records that refer to the same individual. This term is meant to embrace the computer implemented entities of the First Generation patents And applications. The term "field" encompasses any portion of a record into which a field value may be entered. The term "field value" encompasses means and manners used to represent information, not limited to numerical values. A "field value" may include other types of data values comprising one or more character types or combination of character types. This term is meant to embrace the "data field values" of the First Generation patents And applications. The term "token" encompasses any part of a field value, including the entirety of a field value. The term "individual" encompasses a natural person, a company, a body of work, and any institution. The term "probability" encompasses any quantitative measure of likelihood or possibility, not limited to numerical quantities between zero and one. The term "record" encompasses any data structure having at least one field. This term is meant to embrace the "entity references" of the First Generation patents And applications. The discussion in this paragraph is meant to provide instances of what is embraced by certain terms by way of non-limiting example and should not be construed as restricting the meaning of such terms.

Certain database operations may be performed iteratively in an electronic database. As described in Section II of U.S. patent application Ser. No. 12/429,408, in each iteration of an electronic database, parameters (e.g., field value probabilities, field value weights, field probabilities, field weights) that are used in certain matching formulas (e.g., to make linking decisions) are calculated. The parameters may be updated with each iteration by replacing parameters from prior iterations or by adding newly generated parameters. As further described in Section II of U.S. patent application Ser. No. 12/429,408, in each iteration of an electronic database, linking operations (e.g., a preliminary linking operation based on parameters generated by a first iteration, a linking operation based on parameters generated by any prior iteration) may be performed. The result of a preliminary linking operation may be that the electronic database now contains entity representations, that is, multiple sets of linked records, where each such linked set is meant to contain records that correspond to the same individual.

Section II of U.S. patent application Ser. No. 12/429,408 further discloses that intermediate operations may be performed between iterations of an electronic database. Such operations may include any, or a combination, of a transitional linking operation, a propagation operation, and a delinking operation.

Section II of U.S. patent application Ser. No. 12/429,408 sets forth that the electronic database may undergo a propagation operation between iterations. Such a propagation operation may insert missing field values in recently linked records. For example, if an iteration results in a first record and a second record being linked, and the first record contains a null value in a field in which the second record includes a non-null field value, then the non-null field value may be propagated to the first record. Likewise, if the second record contains a null field value in a field in which the first record contains a non-null field value, than that non-null field value may be propagated to the second record. A specific example follows. Consider records $r_1$ and $r_2$ reflected below.

| Record | First Name | Last Name | Street Address | SSN | Gender |
|---|---|---|---|---|---|
| $r_1$ | John | Smith | 123 Fake St. | 999-99-999 | |
| $r_2$ | John | Smith | 123 Fake St. | | Male |

If an iteration results in a link between these records, then the SSN of the first record may be propagated to the second record and the Gender of the second record may be propagated to the first record. The resulting records after the propagation step may appear as follows:

| Record | First Name | Last Name | Street Address | SSN | Gender |
|---|---|---|---|---|---|
| $r_1$ | John | Smith | 123 Fake St. | 999-99-999 | *Male* |
| $r_2$ | John | Smith | 123 Fake St. | *999-99-999* | Male |

In certain embodiments, a propagation operation may insert a missing portion of a field value into a field that contains a partially-null field value if the partially-null field value matches the field value. In such an embodiment, an initial propagation operation may insert a middle name field value into a middle name field that contains only a middle initial. Accordingly, if an iteration results in a first record and a second record being linked, and the first record contains a partially-null field value in a field in which the second record includes a non-null field value, then the missing portion of the non-null field value may be propagated to the first record if the partially-null field value matches the non-null field value. Likewise, if the second record contains a partially-null field value in a field in which the first record contains a non-null field value, than that missing portion of the non-null field value may be propagated to the second record if the partially-null field value matches the non-null field value. A specific example follows. Consider records $r_1$, $r_2$, $r_3$ reflected below.

| Record | First Name | Middle Name | Last Name | SSN | Gender |
|---|---|---|---|---|---|
| $r_1$ | John | A. | Smith | 999-99-999 | Male |
| $r_2$ | John | | Smith | 999-99-999 | Male |
| $r_3$ | John | Allan | Smith | 999-99-999 | Male |

If an iteration results in a link between these records, then the missing portion of the Middle Name field value of the third record may be propagated to the first record since the partially-null field value (e.g., A.) of the first record matches the non-null field value (e.g., Allan) of the third record. Furthermore, the Middle Name field value of the third record may be propagated to the second record. The resulting records after the propagation step may appear as follows:

| Record | First Name | Middle Name | Last Name | SSN | Gender |
|---|---|---|---|---|---|
| $r_1$ | John | *Allan* | Smith | 999-99-999 | Male |
| $r_2$ | John | *Allan* | Smith | 999-99-999 | Male |
| $r_3$ | John | Allan | Smith | 999-99-999 | Male |

In certain embodiments, a field value may be segmented into portions. In such embodiments, field values with greater portions may be considered more precise and field values with less portions may be considered less precise. A propagation operation may insert a missing portion of a segmented field value into a field that contains a partially-null field value that exists as a result of less precision if the partially-null field value matches the segmented field value. For example, the preciseness of field values in a field that contains dates may vary from record to record (e.g., YYYYMMDD, YYYY, YYYYMM). Accordingly, if an iteration results in a first record and a second record being linked, a propagation operation may propagate a missing portion of a more precise date field value from the first record into a date field of the second record that contains a less precise date field value if the less precise date field value matches the more precise date field value. In another example, the preciseness of field values in a telephone number field may vary from record to record. Accordingly, if an iteration results in a first record and a second record being linked, a propagation operation may propagate a missing portion of a more precise telephone number field value from the first record into a telephone number field of the second record that contains a less precise telephone number field value if the less precise telephone number field value matches the more precise telephone number field value. A specific example follows. Consider records $r_1$, $r_2$, $r_3$ reflected below.

| Record | First Name | Last Name | Date Of Birth | Telephone Number | Gender |
|---|---|---|---|---|---|
| $r_1$ | John | Smith | 19670923 | 000-555-8866 | Male |
| $r_2$ | John | Smith | 19670000 | 555-555-8866 | Male |
| $r_3$ | John | Smith | | 000-555-8866 | Male |

If an iteration results in a link between these records, then a missing portion of the more precise Date Of Birth field value of the first record may be propagated to the second record since the less precise Date Of Birth field value (e.g., 19670000) of the second record matches the more precise Date Of Birth field value (e.g., 19670923) of the first record. Likewise, a missing portion of the more precise Telephone Number field value of the second record may be propagated to the first record and the third record since the less precise Telephone Number field values of the first and third records (e.g., 000-555-8866) matches the more precise Telephone Number field value of the second record (e.g., 555-555-8866). The resulting records after the propagation step may appear as follows:

| Record | First Name | Last Name | Date Of Birth | Telephone Number | Gender |
|---|---|---|---|---|---|
| $r_1$ | John | Smith | 19670923 | *555-555-8866* | Male |
| $r_2$ | John | Smith | 19670923 | 555-555-8866 | Male |
| $r_3$ | John | Smith | *19670923* | *555-555-8866* | Male |

In certain embodiments, a group of fields may be related. In such embodiments, a propagation operation may insert a field value into a field of a record that is part of a group of related fields if the field values in the remaining related fields of the record match the corresponding related field values in a record of the inserted field value. For example, an apartment number field, a street address field, a city field, and a state field may be related. Accordingly, if an iteration results in a first record and a second record being linked, a propagation operation may propagate an apartment number field value from the first record into an apartment number field of the second record if the street address field value, city field value, and state field value of the second record matches the street address field value, city field value, and state field value of the first record. A specific example follows. Consider records $r_1$ and $r_2$ reflected below.

| Record | Last Name | Apartment Number | Street Address | City | State |
|---|---|---|---|---|---|
| $r_1$ | Smith | 21 | 123 Fake St. | New York | New York |
| $r_2$ | Smith |    | 123 Fake St. | New York | New York |

If an iteration results in a link between these records, then the Apartment Number field value of the first record may be propagated to the second record since the Street Address field value, City field value, and State field value of the second record matches the Street Address field value, City field value, and State field value of the first record. The resulting records after the propagation step may appear as follows:

| Record | Last Name | Apartment Number | Street Address | City | State |
|---|---|---|---|---|---|
| $r_1$ | Smith | 21 | 123 Fake St. | New York | New York |
| $r_2$ | Smith | *21* | 123 Fake St. | New York | New York |

In the above tables, the field values or portions of field values propagated between linked records are italicized for purposes of illustration. It should be noted that the fields used in the examples above to illustrate the partial propagation techniques described herein are exemplary. Any field in any record of the electronic database on which partial propagation may be performed may be used in partial propagation techniques.

Note that it may be possible for two records linked in the same entity representation to have different field values in the same field. For purposes of the propagation operation, mechanisms for selecting the value to propagate to records having null in the associated field are discussed presently. In some embodiments, the field value that occurs most frequently in a given field in records linked to the same entity representation may be propagated to records linked to the same entity representation that contain a null value in the given field. In the case where two or more field values occur with the same frequency in a given field of records linked to the same entity representation, the field value with the most information (highest specificity) may be selected for propagation.

In certain embodiments, a record in which propagation has occurred may include propagation fields that correspond to other fields in the record. In such embodiments, a propagation field of a record may include a field value that indicates whether a field value in a corresponding field of the record was propagated during a propagation operation. For example, a flag field value (e.g., a one (1)) in a propagation field of a record indicates that the field value in the corresponding field of the record was propagated after the previous iteration. In another example, a null field value in a propagation field of a record indicates that the field value in the corresponding field of the record was not propagated. Elaborating on one of the prior examples described above, propagation fields of the exemplary records $r_1$ and $r_2$ in which the propagation step has occurred may appear as follows:

| Record | First Name | Last Name | Street Address | SSN | Gender | SSN' | Gender' |
|---|---|---|---|---|---|---|---|
| $r_1$ | John | Smith | 123 Fake St. | 999-99-999 | *Male* |   | 1 |
| $r_2$ | John | Smith | 123 Fake St. | *999-99-999* | Male | 1 |   |

As illustrated above, the flag field value (e.g., a one (I)) in the Gender' field (a propagation field) of record $r_1$ indicates the Male field value in the Gender field of record $r_1$ was the result of the most recent propagation operation. Likewise, the flag field value (e.g., a one (1)) in the SSN' field (a propagation field) of record $r_2$ indicates the 999-99-999 field value in the SSN field of record $r_2$ was the result of the most recent propagation operation. In addition, the null field value in the SSN' field of record $r_1$ indicates the 999-99-999 field value in the SSN field of record $r_1$ was not the result of the most recent propagation operation. Likewise, the null field value in the Gender' field of record $r_2$ indicates the Male field value in the Gender field of record $r_2$ was not the result of the most recent propagation operation. Accordingly, database operations may determine whether a field value in a field of a record is the result of the most recent propagation operation by accessing the propagation fields of the record.

In certain embodiments, a propagation field may contain a field value that indicates the degree of propagation. For example, if a missing portion of a middle name field value is propagated to a middle name field that contains a middle initial, a corresponding propagation field may contain a field value that indicates the amount of characters propagated as the missing portion. In another example, if a missing portion of a segmented date field value (e.g., the DD portion of a YYYYMMDD field value) is propagated to a date field that contains a YYYYMM field value, a corresponding propagation field may contain a field value that indicates the segments of the segmented field value that are propagated. Accordingly, the corresponding propagation field may contain field value that includes a bit map with a bit set to one (1) for each segment propagated (e.g., 0b011). Other encoding schemes may be used to indicate the degree of propagation. Note that the field values in the propagation fields may be cleared with each new iteration.

In certain embodiments, the delinking techniques described herein may be performed iteratively before, during, or after any database process. That is, the delinking techniques may be performed before, during, or after a first iteration of a database process, a second iteration of a database process, a third iteration of a database process, etc. In such embodiments, the delinking techniques may be performed as an intermediate operation among one or more of those described in reference to block 220 of FIG. 2 in U.S. patent application Ser. No. 12/429,408 entitled "Automated Calibration Of Negative Field Weighting Without The Need For Human Interaction," filed on Apr. 24, 2009, which is incorporated by reference herein in its entirety. For example, the delinking techniques described herein may be performed iteratively before, during, or after any, or a combination, of a linking operation, a preliminary linking operation, a transitional linking operation, a propagation operation, and a delinking operation, as such operations are disclosed in Sections I and II of U.S. patent application Ser. No. 12/429,408. When additional information is added to the electronic database, the delinking processes described herein may be iterated one or more additional times in order to ensure that the original links and existing links are not erroneous. In certain embodiments, the delinking techniques described herein may be performed sporadically, e.g., independently of the iterated operations disclosed in Sections I and II of U.S. patent application Ser. No. 12/429,408.

Some embodiments of the present invention provide for correcting incorrect groupings of linked records in entity representations as records are added to an electronic database. In the early stages of an electronic database, it may be reasonable to link certain ambiguous records to the same entity representation. Later, after additional data is added to the electronic database, it may become clear that some of the original or existing linking is erroneous. Furthermore, since matching records typically may be a probabilistic process, erroneous links may result. Accordingly, embodiments of the present invention provide techniques for delinking a record linked to an entity representation.

In one embodiment, a technique for delinking determines whether a record is erroneously linked to an entity representation based on the proximity of the record to other records linked to the entity representation (e.g., the aggregate internal match score) and the proximity of the record to other records that are not linked to the entity representation (e.g., the aggregate external match score) without human interaction. More particularly, this delinking technique is used to consider a record linked to an entity representation and decide whether the record is closer to other records in the electronic database that are not linked to the entity representation than it is to other records that are actually linked to the entity representation. In such an embodiment, a record that is determined to be closer in proximity to the other records in the electronic database that are not linked to the entity representation is considered an erroneously linked record and is delinked from the entity representation. The delinking technique presently discussed may be used and integrated with other delinking techniques discussed in the First Generation patents And applications and the Second Generation patents And applications.

FIG. 1 is an exemplary diagram of an embodiment of an invention. Diagram 100 of FIG. 1 illustrates collections of records that are linked to entity representations 102, 104, 106. In an exemplary embodiment, records 108-116 are linked to entity representation 102, records 118-130 are linked to entity representation 104, and records 132-142 are linked to entity representation 106 using the linking techniques described in the First Generation patents And applications or the Second Generation patents And applications. By way of a non-limiting example, an electronic database may only contain the records and entity representations in diagram 100. Since each of the records 108-116 match at least one other record (as indicated by the lines between the records), the collection of records 108-116 may refer to the same individual and entity representation 102. In addition, since each of the records 118-130 match at least one other record, the collection of records 118-130 may refer to the same individual (that is not the individual referenced by records 108-116) and entity representation 104. In addition, since each of the records 132-142 match at least one other record, the collection of records 132-142 may refer to the same individual (that is not the individual referenced by records 108-116 or records 118-130) and entity representation 106.

The proximity of a record to other records commonly linked to an entity representation and the proximity of the record to other records in the electronic database that are not linked to the common entity representation may be represented graphically as illustrated in FIG. 1. If the record is determined to be closer in proximity to the other records in the electronic database that are not linked to the common entity representation, the record is considered to be erroneously linked. In diagram 100, record 118, which is linked to entity representation 104, is closer in proximity to records 132-142 of entity representation 106 than the other records 120-130 that are linked to entity representation 104. Accordingly, the delinking technique discussed presently may delink record 118 from entity representation 104. As a result of the delinking, records 120-130 remain linked to entity representation 104 and record 118 is not linked to any entity representation in the electronic database.

Figure 2:
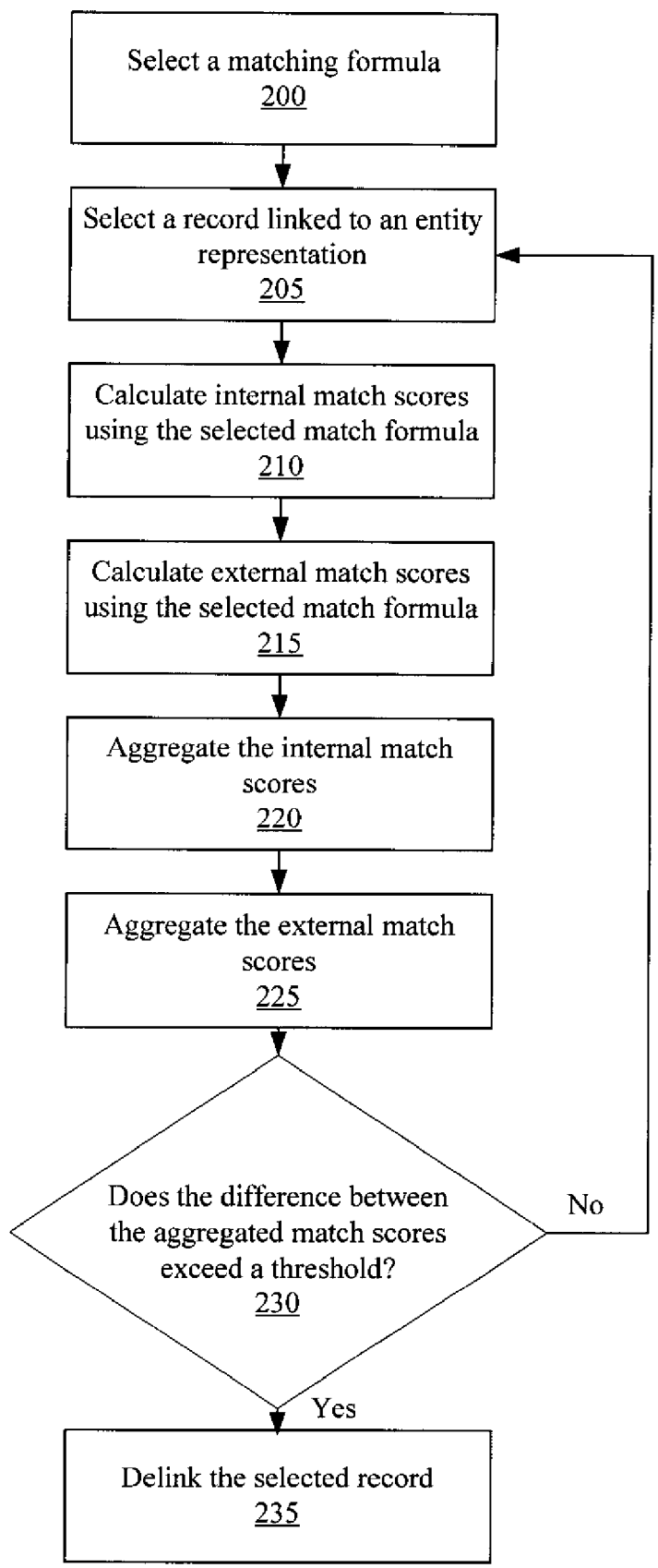
FIG. 2 illustrates a flowchart depicting an embodiment of an invention.

FIG. 2 is a flowchart depicting an exemplary embodiment of an invention. In general, embodiments of the delinking technique may select a record in an electronic database that is linked to an entity representation. The delinking technique then determines the proximity (e.g., the aggregate internal match score) of the selected record to other records linked to the entity representation and the proximity of the selected record to other records in the electronic database that are not linked to the entity representation (e.g., the aggregate external match score). If, for example, the selected record is closer in proximity to other records in the electronic database that are not linked to the entity representation, the delinking technique delinks the selected record from the entity representation. An internal match score may be calculated without propagation having occurred in either the selected record or the other records linked to a common entity representation. An external match score may be calculated without propagation having occurred in the selected record linked to an entity representation, but with the propagation having occurred in the other records in the electronic database that are not linked to the entity representation.

At block 200, the exemplary embodiment selects a matching formula. In general, some embodiments may operate by comparing field values in common fields of two records. The comparisons may be performed in the context of a matching formula (e.g., Equations 2-5 described in Section I of U.S. patent application Ser. No. 12/429,408). Such comparisons may yield, for each field, a probability that the field values match. In some embodiments, a given probability may be one (1) if the fields exactly match and zero (0) otherwise. Other techniques for generating such probabilities are disclosed in the First Generation patents And applications. In general, certain embodiments may calculate, for two records, a match score as a weighted sum of such probabilities. That is, each such probability may be multiplied by a weight, and those products of probabilities and weights may then be summed to calculate a match score for the two records. Certain embodiments of inventions disclosed in U.S. patent application Ser. No. 12/429,408 (e.g., in Sections II, III, IV, V and X) generate weights used in such weighted sums. The match score may be compared to a threshold to determine whether the records are associated with the same individual with a known probability.

At block 205, the exemplary embodiment selects a record linked to an entity representation to consider. In such embodiments, any record in the electronic database that is linked to an entity representation (e.g., not a standalone record) may be selected.

At block 210, the exemplary embodiment calculates internal match scores using the matching formula selected at block 200. Details of such calculations are discussed below in relation to Equation 1.

An exemplary technique for calculating internal match scores is discussed presently. In certain embodiments, an internal match score is a score associated with the selected record and another record linked to a common entity representation. In such embodiments, an internal match score is calculated for each record pair of an entity representation that consists of the selected record and another record that is linked to the entity representation. For example, an internal match score that indicates a likelihood that a record pair of an entity representation references the same individual may be scored as:

$$S(r_1, r_2) = \sum_f p_f w_f.$$ Equation 1

In the above record matching formula, $S(r_1, r_2)$ represents a score associated with records $r_1$ and $r_2$, where record $r_1$ represents a selected record linked to the entity represented and record $r_2$ represents another record linked to the entity representation, the sum may be over all fields f common to both $r_1$ and $r_2$, and each $p_f$ may be a probability that the field values of $r_1$ and $r_2$ match in field f. In an exemplary, non-limiting embodiment, if the field value in field f is non-null and identical between records $r_1$ and $r_2$, then the corresponding probability $p_f$ may be set equal to one, otherwise, it may be set equal to zero. In another exemplary, non-limiting embodiment, if the field values in field f are non-null and an exact or near match between records $r_1$ and $r_2$, then the corresponding probability $p_f$ may be set equal to one, otherwise, it may be set equal to zero. Such embodiments are particularly suitable for implementing the techniques of Sections III and IV in U.S. patent application Ser. No. 12/429,408, where a near match is determined according to certain distance functions. Alternate techniques for determining the probabilities $p_f$ are disclosed in the First Generation patents And applications. Such techniques include those that assign nonzero probabilities $p_f$ to field values that are not exactly identical. Note that Equation 1 takes into account all fields common to both $r_1$ and $r_2$. In Equation 1, each $w_f$ may be a field weight associated with field f. Techniques for determining these quantities are disclosed in detail in at least Sections I, II, and IX of U.S. patent application Ser. No. 12/429,408.

In certain embodiments, internal match scores may be calculated without propagation having occurred in either the selected record or the other records linked to a common entity representation. In such embodiments, field values inserted in the fields of the selected record and the other records linked to a common entity representation as a result of the most recent propagation operation are treated as null field values in the internal match score calculations. By way of a non-limiting example, consider the following exemplary entity representation in which record $r_1$ is the selected record and records $r_2$ and $r_3$ are the other records linked to the entity representation:

| Record | First Name | Last Name | Gender | First Name' | Last Name' | Gender' |
|---|---|---|---|---|---|---|
| $r_1$ | John | Smith | *Male* | | | 1 |
| $r_2$ | *John* | Smith | Male | 1 | | |
| $r_3$ | John | *Smith* | Male | | 1 | |

In the above table, the field values propagated between linked records are italicized for purposes of illustration.

As illustrated in the above table, a flag field value (e.g., a one (1)) in the Gender' field (e.g., a propagation field) of record $r_1$ indicates the Male field value in the Gender field of record $r_1$ was the result of the most recent propagation operation. A flag field value (e.g., a one (1)) in the First Name' field (e.g., a propagation field) of record $r_2$ indicates the John field value in the First Name field of record $r_2$ was the result of the most recent propagation operation. A flag field value (e.g., a one (1)) in the Last Name' field (e.g., a propagation field) of record $r_3$ indicates the Smith field value in the Last Name field of record $r_3$ was the result of the most recent propagation operation. In addition, a null field value in any of the propagation fields of records $r_1$, $r_2$, $r_3$ indicates that the field value in the corresponding field was not the result of the most recent propagation operation. Because the propagated field values in the selected record and the other records linked to a common entity representation are treated as null field values in the internal match score calculations, the exemplary entity representation above may be represented for illustration purposes as follows:

| Record | First Name | Last Name | Gender | First Name' | Last Name' | Gender' |
|---|---|---|---|---|---|---|
| $r_1$ | John | Smith | | | | 1 |
| $r_2$ | | Smith | Male | 1 | | |
| $r_3$ | John | | Male | | 1 | |

Continuing the non-limiting example, internal match scores may be calculated by comparing field values in common fields of the selected record $r_1$ and record $r_2$ and comparing field values in common fields of the selected record $r_1$ and record $r_3$. For example, a comparison of the field values in the First Name field and the Gender field of records $r_1$ and $r_2$ is considered a non-match and the corresponding probabilities (e.g., $p_f$) are set equal to zero in a first internal match score calculation. In another example, a comparison of the field values in the Last Name field and the Gender field of records $r_1$ and $r_3$ is considered a non-match and the corresponding probabilities (e.g., $p_f$) are set equal to zero in a second internal match score calculation. Accordingly, the internal match scores are calculated without propagation having occurred in either the selected record $r_1$ or the other records $r_2$ and $r_3$ linked to the exemplary entity representation illustrated in the above table.

Alternatively, internal match scores without propagation having occurred may be calculated during a prior linking operation. As described in Sections I and II of U.S. patent application Ser. No. 12/429,408, internal match scores may be calculated with propagation having occurred in the selected record and the other records linked to a common entity representation during a linking operation that is performed prior to any delinking techniques. The calculation of such internal match scores are discussed in detail in Sections I and II of U.S. patent application Ser. No. 12/429,408. Accordingly, internal match scores with propagation having occurred and internal match scores without propagation having occurred may be calculated during a linking operation by applying the appropriate internal match score equation. Internal match scores with propagation having occurred may be calculated using Equation 3 described in Section I of U.S. patent application Ser. No. 12/429,408. Internal match scores without propagation having occurred may be calculated as follows:

$$S(r_1, r_2) = \sum_f P_f p_f w_f.$$

Equation 2

In the above record matching formula, $S(r_1, r_2)$ represents a score associated with records $r_1$ and $r_2$, where record $r_1$ represents a selected record linked to the entity represented and record $r_2$ represents another record linked to the entity representation, the sum may be over all fields f common to both $r_1$ and $r_2$, each $P_f$ may indicate whether propagation has occurred in field f, and each $p_f$ may be a probability that the field values of $r_1$ and $r_2$ match in field f. In an exemplary, non-limiting embodiment, if the field value in field f has been propagated, then the corresponding $P_f$ may be set equal to zero, otherwise, it may be set equal to one. In another exemplary, non-limiting embodiment, if the field value in field f is non-null and identical between records $r_1$ and $r_2$, then the corresponding probability $p_f$ may be set equal to one, otherwise, it may be set equal to zero. In another exemplary, non-limiting embodiment, if the field values in field f are non-null and an exact or near match between records $r_1$ and $r_2$, then the corresponding probability $p_f$ may be set equal to one, otherwise, it may be set equal to zero. Such embodiments are particularly suitable for implementing the techniques of Sections III and IV in U.S. patent application Ser. No. 12/429,408, where a near match is determined according to certain distance functions. Alternate techniques for determining the probabilities $p_f$ are disclosed in the First Generation patents And applications. Such techniques include those that assign nonzero probabilities $p_f$ to field values that are not exactly identical. Note that Equation 2 takes into account all fields common to both $r_1$ and $r_2$. In Equation 2, each $w_f$ may be a field weight associated with field f. Techniques for determining these quantities are disclosed in detail in at least Sections I, II, and IX of U.S. patent application Ser. No. 12/429,408.

Accordingly, internal match scores without propagation having occurred may be calculated during a prior linking operation and stored for use during the presently described delinking technique. In such embodiments, in block 210, the internal match scores without propagation having occurred calculated during a prior linking operation may be accessed and utilized. Note that the internal match scores with propagation having occurred and internal match scores without propagation having occurred may be cleared and replaced with new scores with each new iteration.

At block 215, the exemplary embodiment calculates external match scores using the matching formula selected at block 200. An exemplary technique for calculating external match scores is discussed presently.

In certain embodiments, an external match score is a score associated with the selected record linked to an entity representation and another record in the electronic database that is not linked to the entity representation. In such embodiments, an external match score is calculated for each record pair that consists of the selected record linked to an entity representation and another record that is not linked to the entity representation. For example, an external match score that indicates a likelihood that a record pair references the same individual may be scored in accordance with Equation 1 that is reproduced below:

$$S(r_1, R_1) = \sum_f p_f w_f.$$

In the above record matching formula, $S(r_1, R_1)$ represents a score associated with records $r_1$ and $R_1$, where record $r_1$ represents the selected record linked to an entity representation and record $R_1$ represents another record in the electronic database that is not linked to the entity representation, the sum may be over all fields f common to both $r_1$ and $R_1$, and each $p_f$ may be a probability that the field values of $r_1$ and $R_1$ match in field f.

In certain embodiments, external match scores may be calculated without propagation having occurred in the selected record linked to an entity representation, but with the propagation having occurred in the other records in the electronic database that are not linked to the entity representation. In such embodiments, field values inserted in the fields of the selected record as a result of the most recent propagation operation are treated as null field values, while the field values inserted in the fields of the other records in the electronic database as a result of the most recent propagation operation are considered in the external match score calculations. By way of a non-limiting example, consider the following first exemplary entity representation in which record $r_1$ is the selected record:

| Record | First Name | Last Name | Gender | First Name' | Last Name' | Gender' |
|---|---|---|---|---|---|---|
| $r_1$ | John | Smith | *Male* | | | 1 |

Further consider, by way of a non-limiting example, the following second exemplary entity representation in which records $R_1$ and $R_2$ are other records in the electronic database that are not linked to the first entity representation:

| Record | First Name | Last Name | Gender | First Name' | Last Name' | Gender' |
|---|---|---|---|---|---|---|
| $R_1$ | *John* | Smith | *Male* | 1 | | 1 |
| $R_2$ | John | Smith | Male | | | |

In the above tables, the field values propagated between linked records are italicized for purposes of illustration.

As illustrated in the above table, a flag field value (e.g., a one (1)) in the Gender' field (e.g., a propagation field) of record $r_1$ indicates the Male field value in the Gender field of record $r_1$ was the result of the most recent propagation operation. A flag field value (e.g., a one (1)) in the First Name' field (e.g., a propagation field) and the Gender' field (e.g., a propagation field) of record $R_1$ indicates the John field value in the First Name field and the Male field value in the Gender field of record $R_1$ was the result of the most recent propagation operation. In addition, a null field value in any of the propagation fields of records $r_1$, $R_1$, $R_2$ indicates that the field value in the corresponding field was not the result of the most recent propagation operation. Because the propagated field values in the selected record $r_1$ are treated as null field values and the propagated field values in records $R_1$ and $R_2$ are considered in the external match score calculations, the first exemplary entity representation above may be represented for illustration purposes as follows:

| Record | First Name | Last Name | Gender | First Name' | Last Name' | Gender' |
|---|---|---|---|---|---|---|
| $r_1$ | John | Smith | | | | 1 |

Further, the second exemplary entity representation above may be represented for illustration purposes as follows:

| Record | First Name | Last Name | Gender | First Name' | Last Name' | Gender' |
|---|---|---|---|---|---|---|
| $R_1$ | John | Smith | Male | 1 | | 1 |
| $R_2$ | John | Smith | Male | | | |

Continuing the non-limiting example, external match scores may be calculated by comparing field values in common fields of the selected record $r_1$ and record $R_1$ and comparing field values in common fields of the selected record $r_1$ and record $R_2$. For example, a comparison of the field values in the Gender field of records $r_1$ and $R_1$ is considered a non-match and the corresponding probability (e.g., $p_f$) is set equal to zero in a first external match score calculation. In another example, a comparison of the field values in the Gender field of records $r_1$ and $R_2$ is considered a non-match and the corresponding probability (e.g., $p_f$) is set equal to zero in a second external match score calculation. Accordingly, the external match scores are calculated without propagation having occurred in the selected record $r_1$ linked to a first exemplary entity representation, but with the propagation having occurred in the other records $R_1$ and $R_2$ that are linked to the second exemplary entity representation.

Alternatively, as described above, external match scores may be calculated during a prior linking operation. In such embodiments, in block 215, the external match scores calculated during a prior linking operation may be accessed and utilized.

At block 220, the exemplary embodiment aggregates the internal match scores. In certain embodiments, the internal match scores calculated at block 210 may be aggregated by selecting the maximum internal match score, calculating an average internal match score, calculating the geometric mean of the internal match scores, or performing any other aggregation technique that combines the internal match scores into a single value. By way of a non-limiting example, consider the following exemplary internal match scores:

| | Internal Match Score |
|---|---|
| $S(r_1, r_2)$ | 10 |
| $S(r_1, r_3)$ | 18 |
| $S(r_1, r_4)$ | 16 |

Continuing the non-limiting example, the exemplary internal match scores illustrated in the above table may be aggregated as follows. A first technique selects the maximum of the internal match scores. Accordingly, an exemplary aggregated internal match score is 18. A second technique calculates the average (e.g., mean, mode, median) internal match score. Accordingly, another exemplary aggregated internal match score may be 14.67 for a mean calculation. A third technique calculates the geometric mean (nth root of a product of n numbers) of the internal match scores. Accordingly, another exemplary aggregated internal match score is 13.85.

At block 225, the exemplary embodiment aggregates the external match scores. In certain embodiments, the external match scores calculated at block 215 may be aggregated by selecting the maximum external match score, calculating an average external match score, calculating the geometric mean of the external match scores, or performing any other aggregation technique that combines the external match scores into a single value. By way of a non-limiting example, consider the following exemplary internal match scores:

| | External Match Score |
|---|---|
| $S(r_1, R_1)$ | 5 |
| $S(r_1, R_2)$ | 9 |
| $S(r_1, R_3)$ | 7 |

Continuing the non-limiting example, the exemplary external match scores illustrated in the above table may be aggregated as follows. A first technique selects the maximum of the external match scores. Accordingly, an exemplary aggregated external match score is 9. A second technique calculates the average (e.g., mean, mode, median) external match score. Accordingly, another exemplary aggregated external match score may be 7 for a mean calculation. A third technique calculates the geometric mean (nth root of a product of n numbers) of the external match scores. Accordingly, another exemplary aggregated external match score is 6.67.

At block 230, the exemplary embodiment compares the difference between the aggregated internal match score and the aggregated external match score to a threshold T. The threshold T may be selected based on design preferences. In one embodiment, a threshold T that increases the likelihood of entity representations being stable may be selected. In another embodiment, a threshold T that increases the likelihood of the links between records in entity representations being accurate may be selected. For example, the threshold T may be selected to be 10, which means a record linked to an entity representation is 1024 times (e.g., $2^{10}$) more likely to be closer in proximity to another entity representation. Any threshold T that is greater than zero may be selected.

If, for example, the difference between the aggregated internal match score and the aggregated external match score is greater than threshold T, the selected record linked to an entity representation is considered closer in proximity to other records in the electronic database that are not linked to the entity representation and is delinked from the entity representation at block 235. If, however, the difference between the aggregated internal match score and the aggregated external match score is not greater than threshold T, the selected record linked to an entity representation is considered closer in proximity to other records linked to the entity representation and another record is selected at block 205.

As described above and in Sections I and II of U.S. patent application Ser. No. 12/429,408, internal match scores with propagation having occurred may be calculated and aggregated. If, for example, the difference between the aggregated internal match score (with propagation having occurred) and the aggregated external match score is greater than the threshold T calculated using Equation 6 of U.S. patent application Ser. No. 12/429,408 (e.g., the linking threshold), the entity representation of the selected record and the entity representation with the strongest external match score (e.g., highest external match score) may be linked.

At block 235, the exemplary embodiment delinks the selected record from the entity representation. In certain embodiments, the actual linking of two records may be performed, by way of non-limiting example, as discussed in the First Generation patents And applications, e.g., by inserting an identical definitive identifier ("DID") in a DID field of both records. Accordingly, each entity representation in the electronic database is associated with a unique DID. Further, each record in the electronic database may be associated with a unique record identifier ("RID"). By way of a non-limiting example, consider the following selected record $r_1$ that is linked to an exemplary entity representation:

| Record | DID | RID | First Name | Last Name | Gender |
|---|---|---|---|---|---|
| $r_1$ | 4 | 124 | John | Smith | |
| $r_2$ | 4 | 683 | | Smith | Male |
| $r_3$ | 4 | 529 | John | | Male |

The exemplary entity representation above is associated with a unique DID (e.g., 4), and each record in the exemplary entity representation is associated with a unique RID.

Because the records of an entity representation are linked by inserting a unique DID in a DID field of the entity representation, a record linked to the entity representation may be delinked by changing the field value in the DID field of the record. Accordingly, the record linked to an entity representation that is closer in proximity to other records in the electronic database that are not linked to the entity representation may be delinked by changing the field value in the DID field of the record to the record's RID. By way of non-limiting example, the selected record $r_1$ may be delinked from the exemplary entity representation as follows:

| Record | DID | RID | First Name | Last Name | Gender |
|---|---|---|---|---|---|
| $r_1$ | 124 | 124 | John | Smith | |
| $r_2$ | 4 | 683 | | Smith | Male |
| $r_3$ | 4 | 529 | John | | Male |

Accordingly, the field value in the DID field of the selected record may be changed to the field value in the RID field of the corresponding record. That is, the selected record may be uniquely identifiable and detached from (e.g., not linked to) any other record in the electronic database.

In certain embodiments, the selected record may be delinked from the entity representation and immediately linked to another entity representation that is closest in proximity to the selected record. That is, the selected record may be linked to an entity representation with the strongest external match score (e.g., highest external match score). Accordingly, the selected record may be linked to another entity representation that is closest in proximity to the selected record by changing the field value in the DID field of the selected record to the DID field value of the records of the entity representation to which the selected record is being linked.

It should be noted that multiple selected records may be considered in parallel to determine the proximity of the selected records to other records in the electronic database. That is, the steps performed in FIG. 2 may be performed for multiple records in parallel using one or more parallel processing systems, such as the parallel processing systems described in the First Generation patents And applications.

Any of the techniques disclosed herein may be applied to a portion of an electronic database as opposed to the entirety of a database.

The techniques discussed herein may be combined with any of the techniques disclosed in the First Generation patents And applications. The inventors explicitly consider such combinations at the time of filing the present disclosure.

The equations, formulas and relations contained in this disclosure are illustrative and representative and are not meant to be limiting. Alternate equations may be used to represent the same phenomena described by any given equation disclosed herein. In particular, the equations disclosed herein may be modified by adding error-correction terms, higher-order terms, or otherwise accounting for inaccuracies, using different names for constants or variables, or using different expressions. Other modifications, substitutions, replacements, or alterations of the equations may be performed.

Any of the steps of FIG. 2 may be performed by a properly programmed computer.

Embodiments, or portions of embodiments, disclosed herein may be in the form of "processing machines," such as general purpose computers, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described herein. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention. In particular, the hardware described in the First Generation patents And applications may be used for any embodiment disclosed herein. A cluster of personal computers or blades connected via a backplane (network switch) may be used to implement some embodiments.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated, for example, that the processor may be two ore more pieces of equipment in two different physical locations. The two ore more distinct pieces of equipment may be connected in any suitable manner. Additionally, the memory may include two or more portions of memory in two or more physical locations.

To explain further, processing as described above is performed by various components and various memories. However, it is appreciated that the processing performed by two or more distinct components as described above may, in accordance with a further embodiment of the invention, be performed by a single component. Further, the processing performed by one distinct component as described above may be performed by two or more distinct components. In a similar manner, the memory storage performed by two or more distinct memory portions as described above may, in accordance with a further embodiment of the invention, be performed by a single memory portion. Further, the memory storage performed by one distinct memory portion as described above may be performed by two or more memory portions. Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, e.g., to a particular type of computer. The computer understands the machine language.

Any suitable programming language may be used in accordance with the various embodiments of the invention. Illustratively, the programming language used may include Enterprise Control Language ("ECL," available from LexisNexis), assembly language, Ada, APL, C, C++, dBase, Fortran, Java, Modula-2, Pascal, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

It is to be appreciated that the set of instructions, e.g., the software, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements an embodiment may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In some embodiments, a variety of "user interfaces" may be utilized to allow a user to interface with the processing machine or machines that are used to implement the embodiment. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that embodiments of the present inventions are susceptible to broad utility and application. Many embodiments and adaptations of the present inventions other than those herein described, as well as many variations, modifications and equivalent arrangements, will be apparent from or reasonably suggested by the present invention and foregoing description thereof, without departing from the substance or scope of the invention.

Accordingly, it is to be understood that this disclosure is only illustrative and exemplary and is made to provide an enabling disclosure. Accordingly, the foregoing disclosure is not intended to be construed or to limit the present invention or otherwise to exclude any other such embodiments, adaptations, variations, modifications or equivalent arrangements.

What is claimed is:

1. A computer implemented process for delinking a record from an entity representation in a computer implemented electronic database using a matching formula, the electronic database comprising a plurality of entity representations, each entity representation comprising a plurality of linked electronic records, each electronic record comprising a plurality of fields, each field capable of containing a field value, the process comprising:
   selecting a matching formula;
   selecting a record linked to an entity representation;
   calculating a plurality of internal match scores for the selected record using the selected matching formula, wherein each internal match score of the plurality of internal match scores is associated with a record pair comprising the selected record and one other record linked to the entity representation;
   calculating a plurality of external match scores for the selected record using the selected matching formula, wherein each external match score of the plurality of external match scores is associated with a record pair comprising the selected record and one other record in the electronic database that is not linked to the entity representation;
   aggregating the plurality of internal match scores into an aggregated internal match score;
   aggregating the plurality of external match scores into an aggregated external match score;
   comparing a difference between the aggregated internal match score and the aggregated external match score to a threshold; and
   delinking, in the electronic database, the selected record from the entity representation as a result of the difference exceeding the threshold.

2. The method of claim 1, wherein calculating the plurality of internal match scores and the plurality of external match scores comprises calculating a plurality of match weights.

3. The method of claim 2, wherein the plurality of match weights comprise at least one field weight.

4. The method of claim 2, wherein the plurality of match weights comprise at least one field value probability.

5. The method of claim 1, wherein each internal match score comprises a weighted sum of probabilities that field values in common fields of an internal record pair match.

6. The method of claim 1, wherein each external match score comprises a weighted sum of probabilities that field values in common fields of an external record pair match.

7. The method of claim 1, wherein aggregating the plurality of internal match scores further comprises selecting a maximum internal match score of the plurality of internal match scores.

8. The method of claim 1, wherein aggregating the plurality of internal match scores further comprises calculating an average of the plurality of internal match scores.

9. The method of claim 1, wherein aggregating the plurality of internal match scores further comprises calculating a geometric mean of the plurality of internal match scores.

10. The method of claim 1, wherein aggregating the plurality of external match scores further comprises selecting a maximum external match score of the plurality of external match scores.

11. The method of claim 1, wherein aggregating the plurality of external match scores further comprises calculating an average of the plurality of external match scores.

12. The method of claim 1, wherein aggregating the plurality of external match scores further comprises calculating a geometric mean of the plurality of external match scores.

13. The method of claim 1, wherein calculating a plurality of internal match scores further comprises treating the selected record and the one other record linked to the entity representation as if a most recent propagation operation has not occurred.

14. The method of claim 1, wherein calculating a plurality of external match scores further comprises treating the selected record as if a most recent propagation operation has not occurred and treating the one other record in the electronic database that is not linked to the entity representation as if the most recent propagation operation has occurred.

15. A computer system for delinking a record from an entity representation in a computer implemented electronic database using a matching formula, the electronic database comprising a plurality of entity representations, each entity representation comprising a plurality of linked electronic records, each electronic record comprising a plurality of fields, each field capable of containing a field value, the system comprising:
   a processor programmed to select a matching formula;
   a processor programmed to select a record linked to an entity representation;
   a processor programmed to calculate a plurality of internal match scores for the selected record using the selected matching formula, wherein each internal match score of the plurality of internal match scores is associated with a record pair comprising the selected record and one other record linked to the entity representation;

a processor programmed to calculate a plurality of external match scores for the selected record using the selected matching formula, wherein each external match score of the plurality of external match scores is associated with a record pair comprising the selected record and one other record in the electronic database that is not linked to the entity representation;

a processor programmed to aggregate the plurality of internal match scores into an aggregated internal match score;

a processor programmed to aggregate the plurality of external match scores into an aggregated external match score;

a processor programmed to compare a difference between the aggregated internal match score and the aggregated external match score to a threshold; and a processor programmed to delink, in the electronic database, the selected record from the entity representation as a result of the difference exceeding the threshold.

16. The system of claim 15, wherein the processor is further programmed to calculate the plurality of internal match scores and the plurality of external match scores by calculating a plurality of match weights.

17. The system of claim 16, wherein the plurality of match weights comprise at least one field weight.

18. The system of claim 16, wherein the plurality of match weights comprise at least one field value probability.

19. The system of claim 15, wherein each internal match score comprises a weighted sum of probabilities that field values in common fields of an internal record pair match.

20. The system of claim 15, wherein each external match score comprises a weighted sum of probabilities that field values in common fields of an external record pair match.

21. The system of claim 15, wherein the processor is further programmed to aggregate the plurality of internal match scores by selecting a maximum internal match score of the plurality of internal match scores.

22. The system of claim 15, wherein the processor is further programmed to aggregate the plurality of internal match scores by calculating an average of the plurality of internal match scores.

23. The system of claim 15, wherein the processor is further programmed to aggregate the plurality of internal match scores by calculating a geometric mean of the plurality of internal match scores.

24. The system of claim 15, wherein the processor is further programmed to aggregate the plurality of external match scores by selecting a maximum external match score of the plurality of external match scores.

25. The system of claim 15, wherein the processor is further programmed to aggregate the plurality of external match scores by calculating an average of the plurality of external match scores.

26. The system of claim 15, wherein the processor is further programmed to aggregate the plurality of external match scores by calculating a geometric mean of the plurality of external match scores.

27. The system of claim 15, wherein the processor is further programmed to calculate a plurality of internal match scores by treating the selected record and the one other record linked to the entity representation as if a most recent propagation operation has not occurred.

28. The system of claim 15, wherein the processor is further programmed to calculate a plurality of external match scores by treating the selected record as if a most recent propagation operation has not occurred and treating the one other record in the electronic database that is not linked to the entity representation as if the most recent propagation operation has occurred.

* * * * *